G. H. TABER.
THROTTLE MECHANISM FOR AUTOMOBILES.
APPLICATION FILED SEPT. 3, 1909.
947,705.
Patented Jan. 25, 1910.
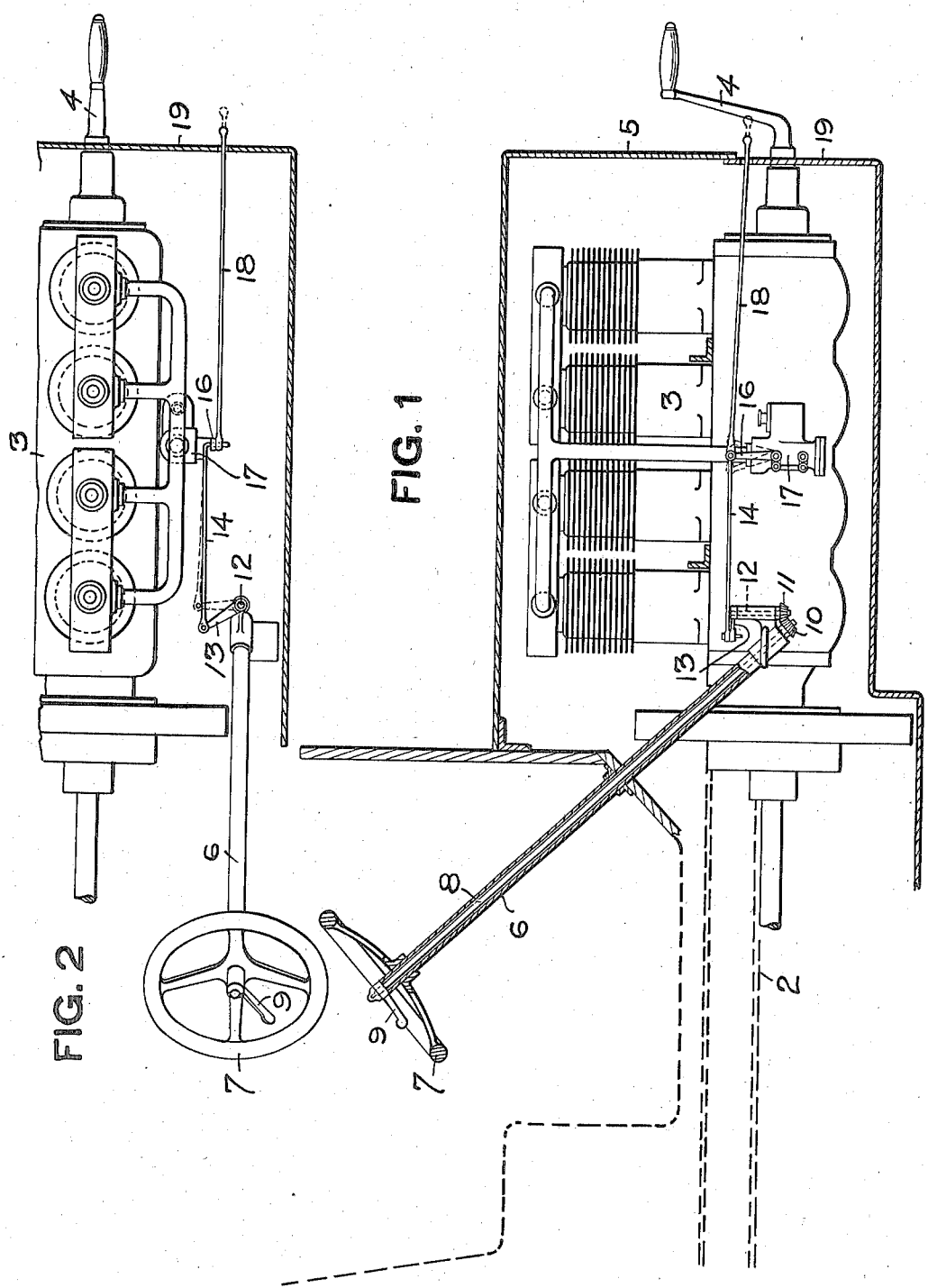
WITNESSES.
J. R. Keller
J. F. Will
INVENTOR.
George H. Taber
By Kay Totten
attys

UNITED STATES PATENT OFFICE.

GEORGE H. TABER, OF PITTSBURG, PENNSYLVANIA.

THROTTLE MECHANISM FOR AUTOMOBILES.

947,705.  Specification of Letters Patent.  Patented Jan. 25, 1910.

Application filed September 3, 1909. Serial No. 516,127.

*To all whom it may concern:*

Be it known that I, GEORGE H. TABER, a resident of Pittsburg, in the county of Allegheny and State of Pennsylvania, have invented a new and useful Improvement in Throttle Mechanisms for Automobiles; and I do hereby declare the following to be a full, clear, and exact description thereof.

My invention relates to an auxiliary throttle control for automobiles.

In the majority of automobiles now on the market, it is necessary to start the same by cranking from the outside of the car, and usually at the extreme front thereof. The admission of the explosive fluid to the engine cylinders is controlled by a butterfly valve in the carbureter at the beginning of the vapor pipe, and this butterfly valve is operated by a lever moving to and fro longitudinally of the car, and there are suitable connections between this lever and throttle lever, which for convenience, is usually placed on or adjacent to the steering wheel where it is in position to be quickly operated by the driver from his seat. Preliminary to the cranking operation, the driver sets the throttle lever to admit sufficient gas for ignition and then goes to the front of the car to turn the crank to start the engine. It may be upon cranking the engine that he finds that the valve has not been opened sufficiently and the engine fails to start. This necessitates his returning to the car and opening the throttle wider. On the contrary, he may have opened the throttle too wide before cranking, whereupon the engine races and shakes the car more or less severely before he can get back to the steering wheel to adjust the lever to bring the engine down to the proper speed.

The object of my invention is to overcome these difficulties and to provide for the operating of the throttle at a point within convenient reach of the crank whereby the throttle may be controlled with minimum delay and inconvenience.

To these ends my invention consists, generally stated, in conjunction with an engine and a throttle valve controlling the supply of motive fluid to the engine, of operative connections leading from said valve to a point within easy reach of the cranking mechanism located outside the car.

In the accompanying drawing Figure 1 is a side elevation in section of a portion of an automobile showing my invention applied thereto; Fig. 2 is a plan view.

In the drawings, the numeral 2 designates the forward end of the chassis of an automobile which supports the engine 3, which may be of any suitable construction. I have not deemed it necessary to illustrate and describe the details of such engine or its connections, as they form no part of my present invention. The engine is cranked by the ordinary crank 4 which extends out beyond the hood 5 at the front of the car, as is the usual construction in this type of automobiles. Extending up through the hollow rod 6 of the steering wheel 7 is the rod 8 which has the throttle lever 9 attached at its upper end. The lower end of the rod 8 carries the beveled pinion 10 which meshes with the beveled pinion 11 on the shaft 12. This shaft 12 carries the crank arm 13 which is connected up to the rod 14. Rod 14 is attached to the arm 16 which operates the valve (not shown) in the carbureter 17. I have not deemed it necessary to illustrate in detail the valve within the carbureter 17 as this is a well known construction, and is familiar to anyone skilled in the art.

Connected to the arm 16 is the rod 18 which extends out through the casing 19 at any desired point, and terminates in a suitable knob, but preferably in such position with reference to the crank 4 that the operator before and after having cranked the car can without any extra movement readily reach the rod 18 and move it back and forth as may be necessary to regulate the throttle valve so as to admit the proper amount of motive fluid to the engine to operate the same at the desired speed.

When my invention is in use the operator first moves the rod 18 into position to open the throttle valve to admit motive fluid to the engine and then cranks the engine. If on cranking the engine he finds he has not opened the throttle valve wide enough to admit sufficient motive fluid to start the engine, he can readily operate the rod 18 without changing his position and open the throttle valve to a greater extent. If upon cranking the engine he finds that the speed of the engine is too great, he can in an instant move the rod 18 and reduce the speed of the engine the desired amount. The speed of the engine may be controlled with the greatest accuracy and without once returning to the car to adjust the throttle from the lever 9. While I have illustrated my invention in connection with a construction in which the rod 18 moves in connection with any movement on the part of the lever 9, or vice versa, I do not confine my invention to this simple construction, but wish to include any independent operation of the rod 18 by means of which the throttle may be controlled by said rod to produce the above results. Furthermore, while my invention is of more particular advantage in the case of automobiles with single magneto ignition which cannot be started from the driver's seat and also of engines which are not equipped with governors, yet it is also of advantage with automobiles which are equipped with either double ignition engine, governor or both devices.

Another advantage of my invention is as follows: Through carelessness of the operator or disarrangement of the speed-changing apparatus, it sometimes happens that a car is cranked when the engine is in gear with the driving wheels, the result being that the car starts either forward or backward, endangering the safety of the operator and others. In such an event, with no one in the car, in order to remedy the trouble with the ordinary arrangement now in use, it would be necessary for the operator to get into the car and throw off the power by means of the throttle lever, or throw out the clutch, or put the change gears in neutral position; but with my device the operator can act instantly from his cranking position at the front of the car, and shut off the power, stopping the motor immediately.

What I claim is:

1. In a throttle valve mechanism for automobiles, the combination with the engine, of a throttle valve controlling the supply of motive fluid thereto, cranking mechanism outside the automobile, and connections leading from said throttle to a point adjacent to said cranking mechanism.

2. In a throttle valve mechanism for automobiles, the combination with the engine, of a throttle valve controlling the supply of motive fluid thereto, cranking mechanism outside the automobile, a rod leading to a point adjacent to said cranking mechanism, and connections between said rod and said throttle valve.

3. In a throttle valve mechanism for automobiles, the combination with the engine and the casing inclosing same both at the front end of the automobile, of a throttle valve controlling the supply of motive fluid thereto, cranking mechanism at the forward end of said casing, and connections leading from said throttle valve to a point outside of said casing adjacent to said cranking mechanism.

4. In a throttle valve mechanism for automobiles, the combination with an engine and a casing inclosing same both at the front end of the automobile, of a throttle valve controlling the supply of motive fluid thereto, cranking mechanism at the forward end of said casing, a rod connected up to said throttle valve, and extending through an opening in said casing.

5. In a throttle valve mechanism for automobiles, the combination with an engine and a casing inclosing same both at the front end of the automobile, of a throttle valve controlling the supply of motive fluid thereto, a cranking mechanism at the forward end of said casing, and a rod connected to said throttle valve and extending through an opening formed in the front end of said casing.

6. In a throttle valve mechanism for automobiles, the combination with an engine, of a throttle valve controlling the supply of motive fluid thereto, connections from said throttle valve to a point within the automobile, and an auxiliary throttle control operative from a point without said automobile.

In testimony whereof, I the said GEORGE H. TABER have hereunto set my hand.

GEORGE H. TABER.

Witnesses:
ROBT. D. TOTTEN,
CHAS. H. EBERT.